(12) United States Patent
Matsushita et al.

(10) Patent No.: US 11,366,310 B2
(45) Date of Patent: Jun. 21, 2022

(54) POLYGONAL MIRROR, DEFLECTOR, OPTICAL SCANNING APPARATUS AND IMAGE FORMING APPARATUS

(71) Applicant: CANON KABUSHIKI KAISHA, Tokyo (JP)

(72) Inventors: Naoki Matsushita, Suntou-gun (JP); Atsushi Takata, Yokohama (JP); Yoshihiko Tanaka, Mishima (JP); Takatoshi Tanaka, Atami (JP); Fumihiko Yamaya, Mishima (JP); Mitsuhiro Ohta, Yokohama (JP); Hiroki Katayama, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 16/386,648

(22) Filed: Apr. 17, 2019

(65) Prior Publication Data

US 2019/0322023 A1 Oct. 24, 2019

(30) Foreign Application Priority Data

Apr. 24, 2018 (JP) .............................. JP2018-082891

(51) Int. Cl.
*G02B 26/12* (2006.01)
*B29C 45/26* (2006.01)
(Continued)

(52) U.S. Cl.
CPC .......... *G02B 26/12* (2013.01); *B29C 45/0025* (2013.01); *B29C 45/2602* (2013.01);
(Continued)

(58) Field of Classification Search
CPC ........ G02B 5/09; G02B 26/12; G02B 26/121; G02B 26/02; B29D 11/00596;
(Continued)

(56) References Cited

U.S. PATENT DOCUMENTS

| 5,296,959 A * | 3/1994 | Asai ........................ B29C 45/26 |
| | | 359/216.1 |
| 7,399,094 B2 | 7/2008 | Hirose et al. |

(Continued)

FOREIGN PATENT DOCUMENTS

| JP | 2005-215516 A | 8/2005 |
| JP | 2017-72660 A | 4/2017 |

OTHER PUBLICATIONS

Yamaya et al., U.S. Appl. No. 16/383,937, filed Apr. 15, 2019.
(Continued)

*Primary Examiner* — Kristina M Deherrera
(74) *Attorney, Agent, or Firm* — Venable LLP

(57) ABSTRACT

A polygonal mirror includes reflecting surfaces, a molded member including a first surface and a second surface, a contact portion, and gate marks. Each of said first surface and said second surface has a polygonal shape. The contact portion and the gate marks are formed at non-overlapping positions with a line segment connecting a vertex of the polygonal shape with a rotation center. The gate marks and the reflecting surfaces are the same in number. A perpendicular bisector of a line segment connecting centers of the gate marks adjacent to each other with respect to a rotational direction of the polygonal mirror is formed at a position passing through an associated vertex of the polygonal shape and the rotation center.

18 Claims, 10 Drawing Sheets

(51) Int. Cl.
*B29D 11/00* (2006.01)
*G03G 15/04* (2006.01)
*B29C 45/00* (2006.01)
*G02B 5/09* (2006.01)
*B29L 11/00* (2006.01)

(52) U.S. Cl.
CPC .......... *B29D 11/00596* (2013.01); *G02B 5/09* (2013.01); *G02B 26/121* (2013.01); *G03G 15/04036* (2013.01); *B29C 2045/0027* (2013.01); *B29L 2011/0058* (2013.01)

(58) Field of Classification Search
CPC .... B29C 2045/0027; B29C 2045/0025; B29C 45/2602; B29C 45/2705; B29L 2001/0058; G03G 15/0436; G03G 15/0409
USPC ....................................................... 359/216.1
See application file for complete search history.

(56) References Cited

U.S. PATENT DOCUMENTS

| | | | |
|---|---|---|---|
| 9,939,566 B2 | 4/2018 | Hoshino et al. | |
| 2012/0050443 A1* | 3/2012 | Lim | G02B 5/10 347/118 |
| 2015/0226958 A1* | 8/2015 | Hayakawa | G02B 5/09 359/200.1 |
| 2019/0091954 A1 | 3/2019 | Takata | |

OTHER PUBLICATIONS

Ohta et al., U.S. Appl. No. 16/383,948, filed Apr. 15, 2019.
Non-Final Office Action in U.S. Appl. No. 16/383,948 (dated May 2021).

* cited by examiner (a)

(b)

POLYGONAL MIRROR, DEFLECTOR, OPTICAL SCANNING APPARATUS AND IMAGE FORMING APPARATUS

FIELD OF THE INVENTION AND RELATED ART

The present invention relates to a polygonal mirror for scanning an image bearing member with laser light, a deflector including the polygonal mirror, an optical scanning apparatus including the deflector, and an image forming apparatus including the optical scanning apparatus.

In a conventional optical scanning apparatus used in an image forming apparatus such as a laser printer, laser light emitted from a light source is optically modulated depending on an image signal, and the modulated laser light is deflected by a deflector comprising, for example, a polygonal mirror and then a photosensitive drum is scanned with the deflected laser light, so that an image is formed on the photosensitive drum by a scanning lens such as an fθ lens and thus an electrostatic latent image is formed on the photosensitive drum. Then, the electrostatic latent image on the photosensitive drum is visualized (developed) into a toner image by a developing device, and the toner image is transferred onto a recording material such as recording paper and is sent to a fixing device, and then the toner image (toner) on the recording material is heat-fixed on the recording material, so that printing is carried out.

Conventionally, a scanner motor which is the deflector used in the optical scanning apparatus is constituted by the polygonal mirror, a rotor, a rotation shaft provided integrally with the rotor, a seat (base) for mounting the polygonal mirror, a bearing sleeve provided integrally with a substrate, a stator, and the like. Further, the polygonal mirror is provided with a bearing surface contacting the seat when the polygonal mirror is mounted on the seat.

Further, as the polygonal mirror mounted in the deflector, for example, a polygonal mirror injection-molded with a resin material is used. Further, in the polygonal mirror molded with the resin material, gate marks which are traces where the resin material is injected during injection molding are arranged as disclosed in Japanese Laid-Open Patent Application (JP-A) 2017-72660, for example. In JP-A 2017-72660, as shown in FIG. 11, gate marks 414 are provided on rectilinear lines passing through a center 410C of a polygonal mirror 410 and vertexes 419. In addition, the gate marks 414 are disposed at positions which are rotation symmetry about the center 410C of the polygonal mirror 410. Incidentally, in JP-A 2017-72660, a constitution in which three gate marks 414 of the polygonal mirror 410 are disposed is disclosed, but JP-A 2017-72660 also discloses that six gate marks which is the same in number as reflecting surfaces. Further, as in JP-A 2005-215516, a polygonal mirror in which a distance between adjacent gate marks in molding with a resin material is defined is disclosed.

Incidentally, reflecting surfaces with high accuracy are needed in order to accurately scan the photosensitive drum with laser light deflected by the polygonal mirror.

However, as disclosed in JP-A 2017-72660, in the case where gates less in number than the surfaces of the polygonal mirror are disposed, there was a possibility that an injection pressure to the reflecting surfaces of the polygonal mirror becomes non-uniform and has the influence on profile irregularity. Further, in the case where the gates which are the same in number as the reflecting surfaces of the polygonal mirror are disposed, there was a possibility that weld lines generate on the reflecting surfaces of the polygonal mirror and this also has the influence on the profile irregularity.

SUMMARY OF THE INVENTION

A principal object of the present invention is to prevent a deterioration of profile irregularity of reflecting surfaces.

According to an aspect of the present invention, there is provided a polygonal mirror comprising: a plurality of reflecting surfaces capable of reflecting laser light emitted from a light source; a molded member molded with a resin material and including a plurality of side surfaces corresponding to the reflecting surfaces, a first surface crossing the side surfaces, and a second surface which crosses the side surfaces and which is provided on a side opposite from the first surface; a contact portion formed on the first surface so as to project in an axial direction passing through a rotation center of the polygonal mirror and configured to contact a rotatable member rotatable about the rotation center of the polygonal mirror; and gate marks on the first surface or the second surface being traces of injection of the resin material, wherein each of the first surface and the second surface has a polygonal shape which has a center as a rotation center of the polygonal mirror and which has a plurality of vertexes each comprising a boundary portion between adjacent side surfaces, wherein the contact portion and the gate marks are formed at non-overlapping positions with a line segment connecting the vertex of the polygonal shape with the rotation center, wherein the gate marks and the reflecting surfaces are the same in number, and wherein a perpendicular bisector of a line segment connecting centers of the gate marks adjacent to each other with respect to a rotational direction of the polygonal mirror is formed at a position passing through an associated vertex of the polygonal shape and the rotation center.

Further features of the present invention will become apparent from the following description of exemplary embodiments with reference to the attached drawings.

Figure 2:
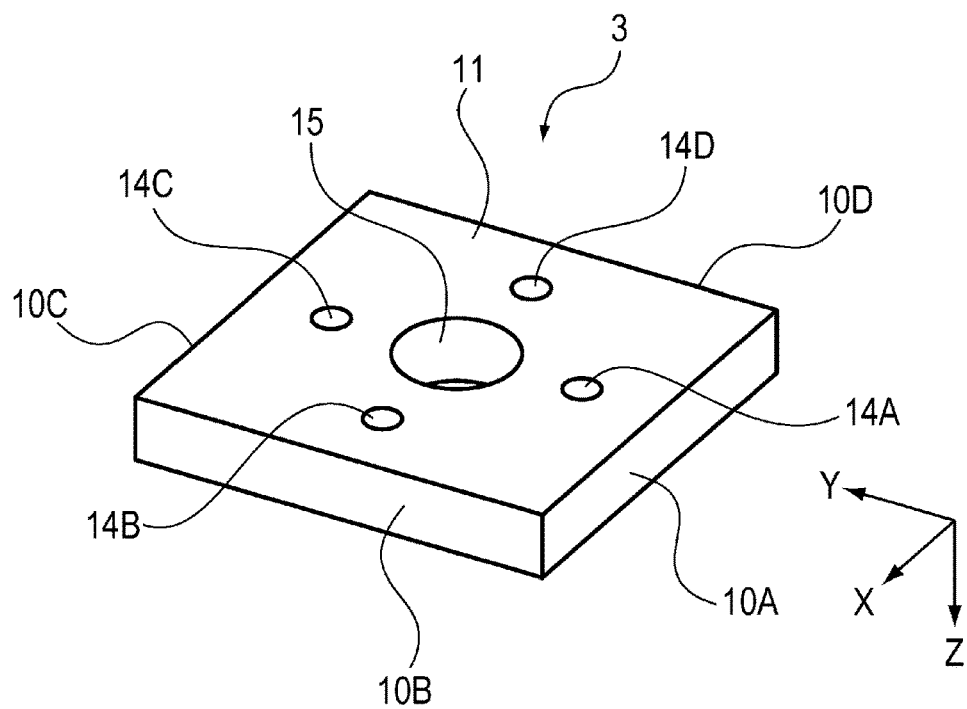
Figure 2:
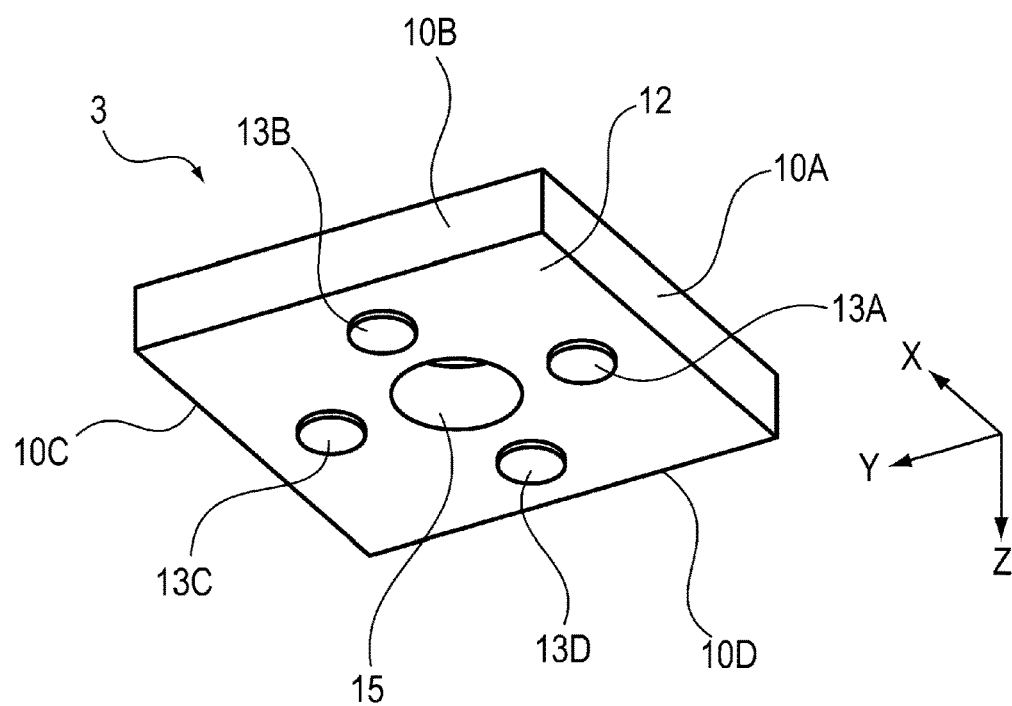

Part (a) of FIG. 2 is a perspective view of a top (upper) surface of a polygonal mirror according to Embodiment 1, and part (b) of FIG. 2 is a perspective view of a bottom (lower) surface of the polygonal mirror according to Claim 1.

Figure 3:
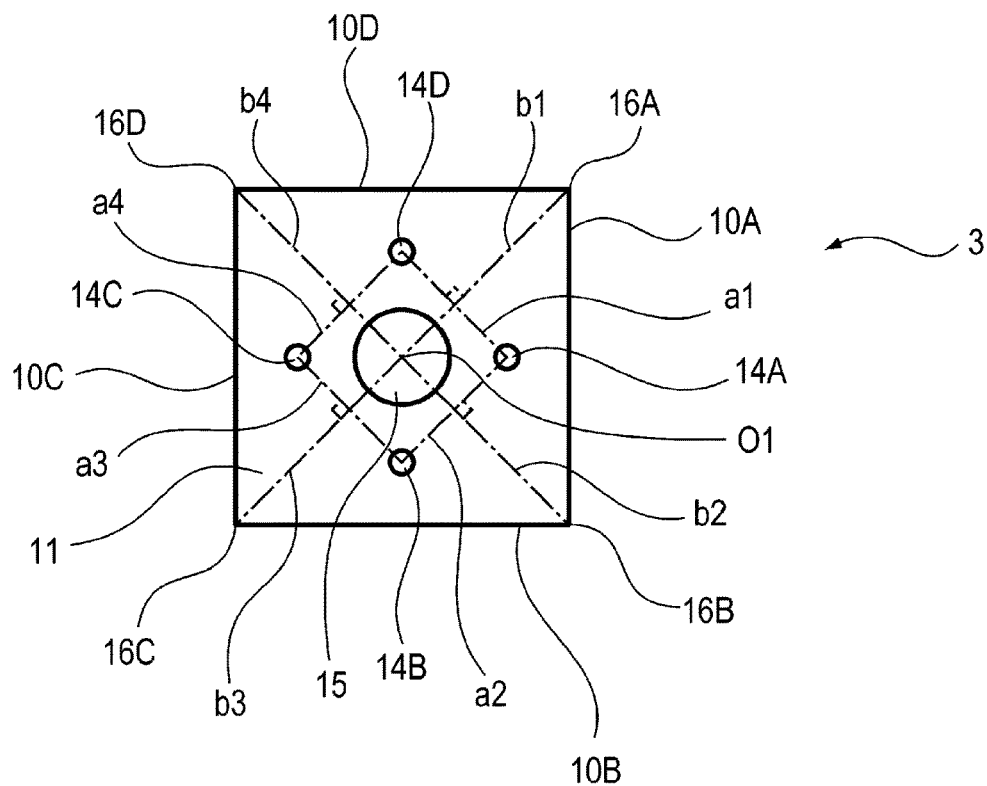
Figure 3:
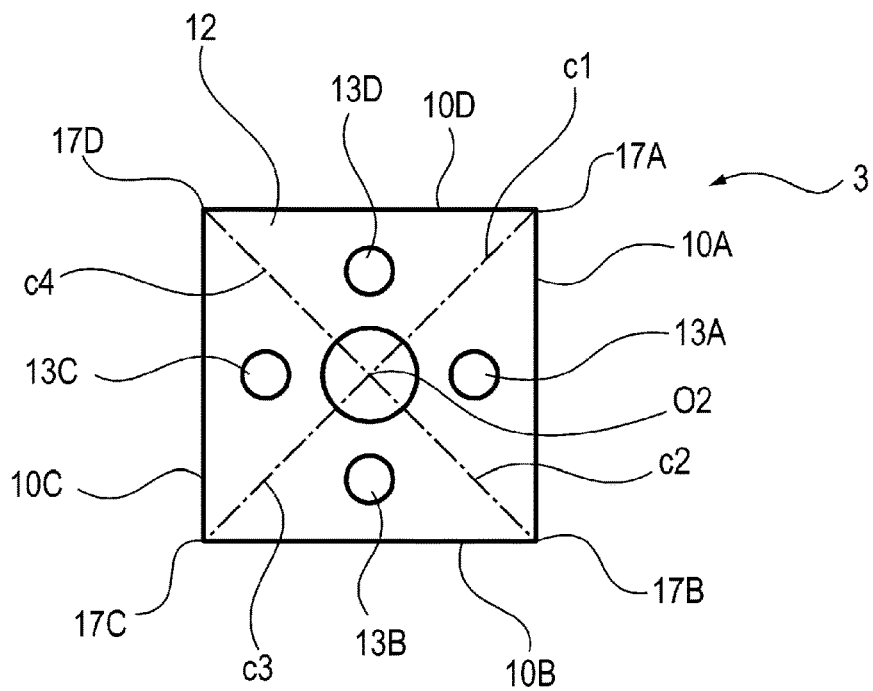

Part (a) of FIG. 3 is a top (plan) view of the polygonal mirror according to Embodiment 1, and part (b) of FIG. 3 is a bottom view of the polygonal mirror according to Embodiment 1.

Figure 4:
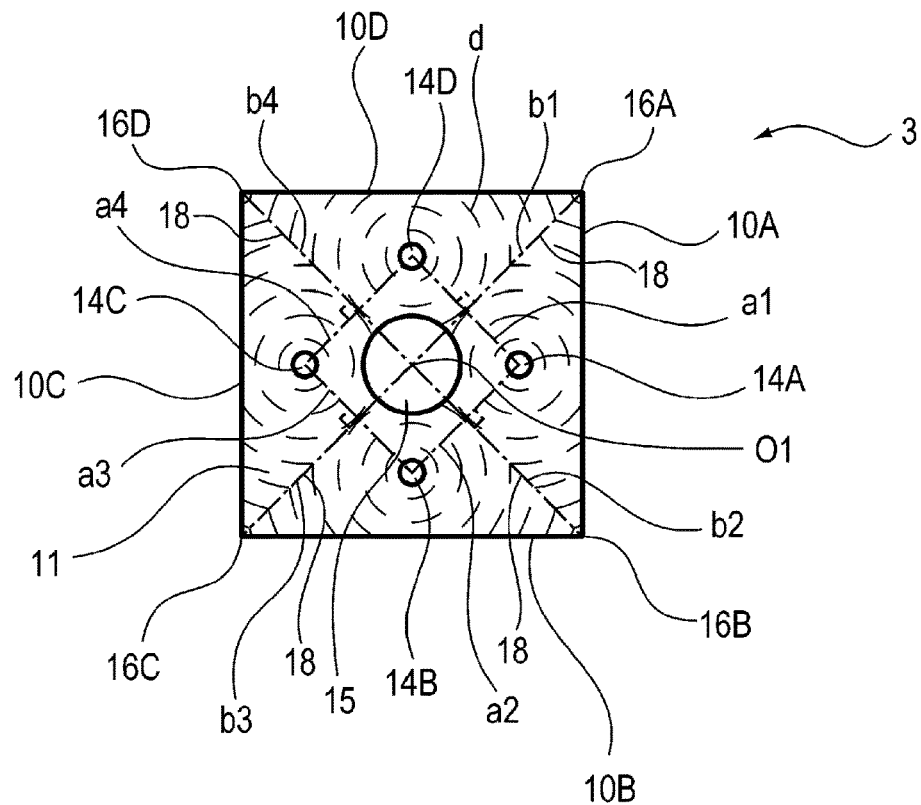
Figure 4:
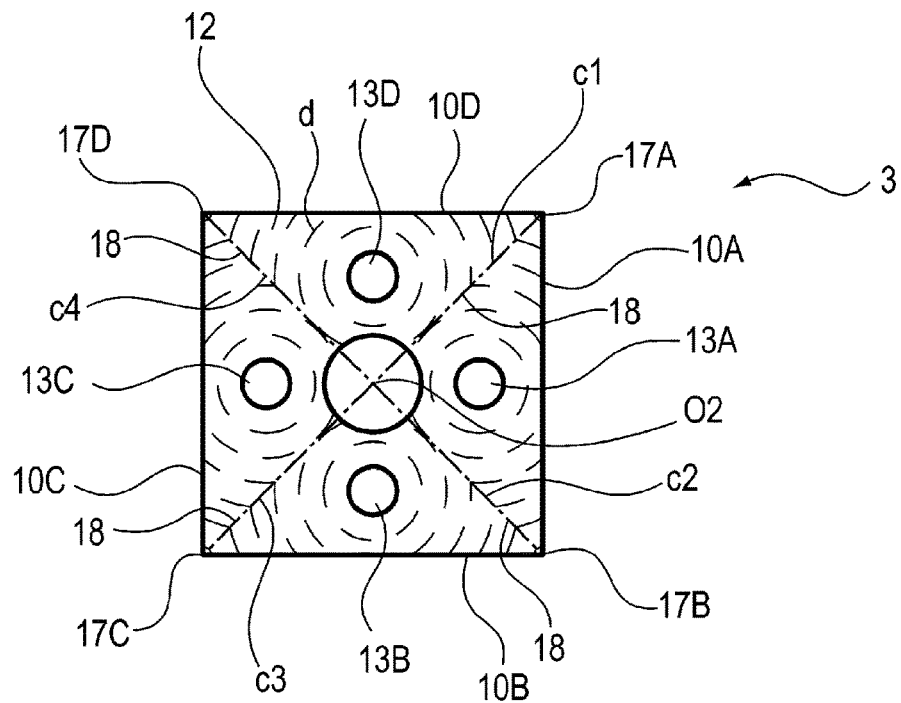

Part (a) of FIG. 4 is a schematic view for illustrating a flow of a resin material during injection molding on a top surface side of the polygonal mirror according to Embodiment 1, and part (b) of FIG. 4 is a schematic view for illustrating a flow of the resin material during the injection molding on a bottom surface side of the polygonal mirror according to Embodiment 1.

Figure 5:
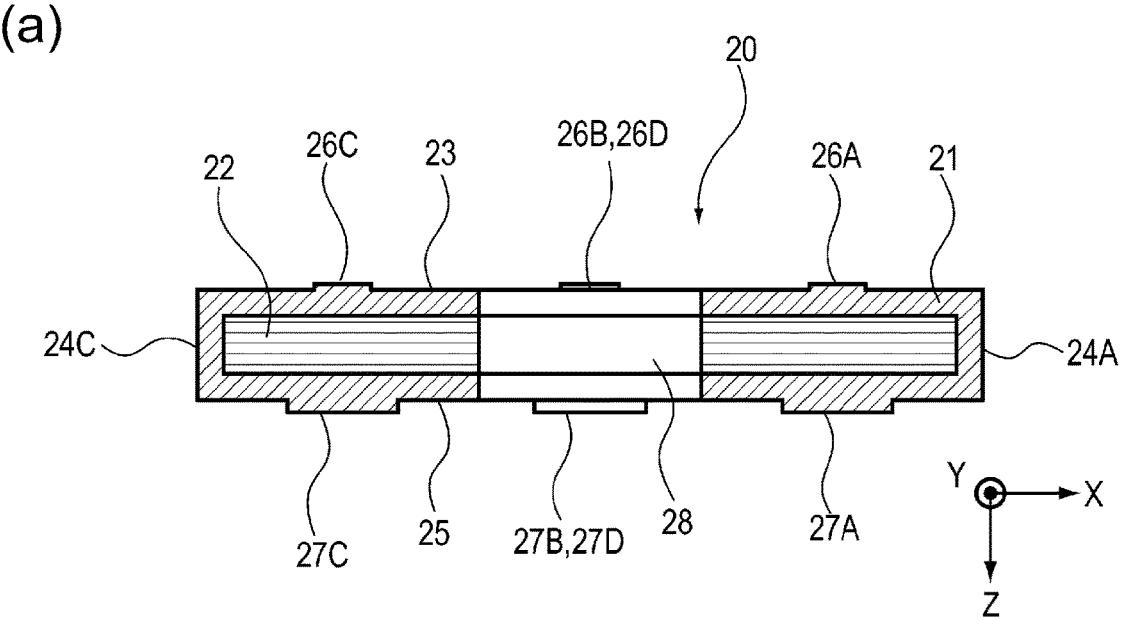
Figure 5:
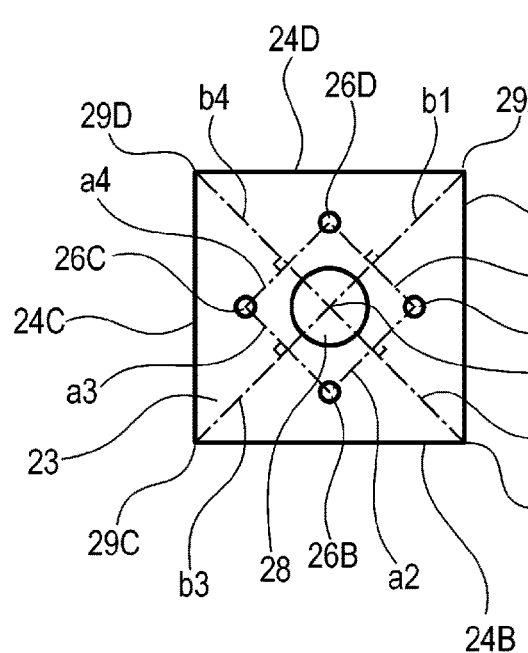
Figure 5:
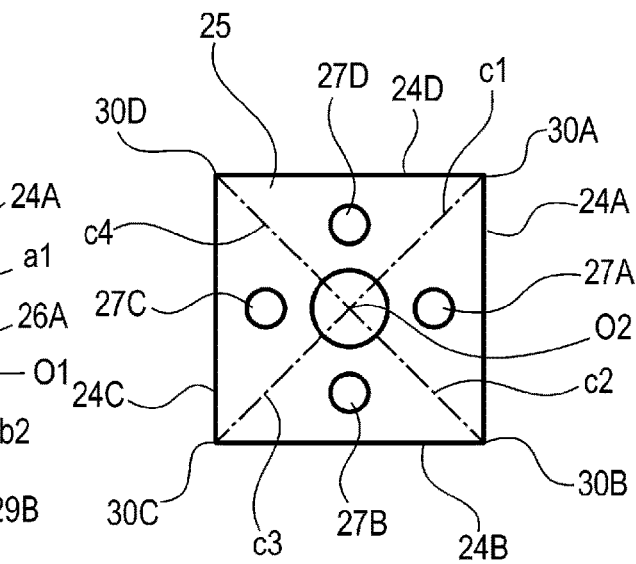

Part (a) of FIG. 5 is a sectional view including a rotation center of a polygonal mirror according to Embodiment 2, part (b) of FIG. 5 is a top view of the polygonal mirror according to Embodiment 2, and part (c) of FIG. 5 is a bottom view of the polygonal mirror according to Embodiment 2.

Figure 6:
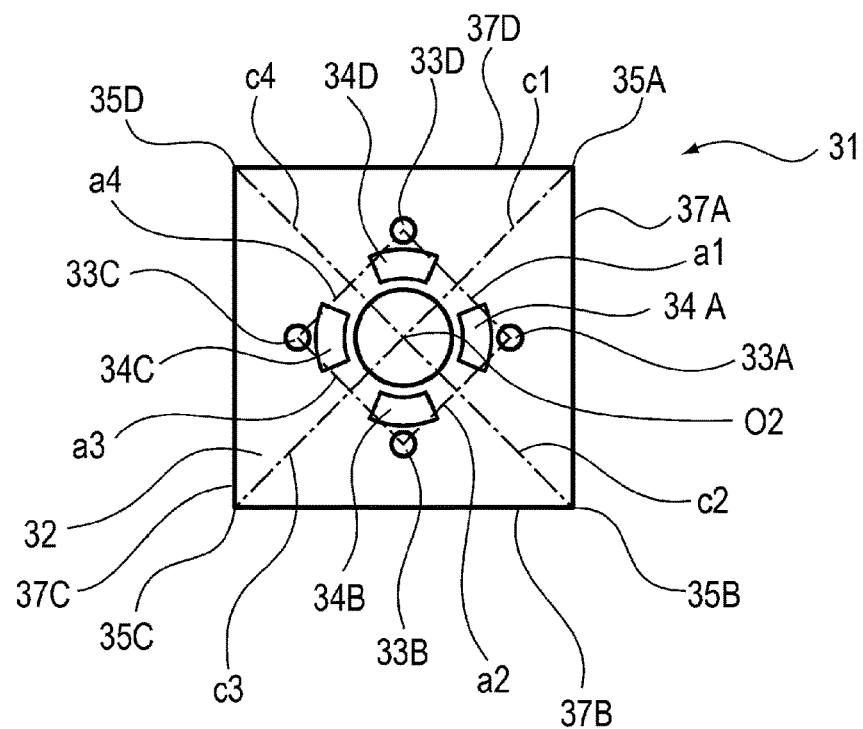
Figure 6:
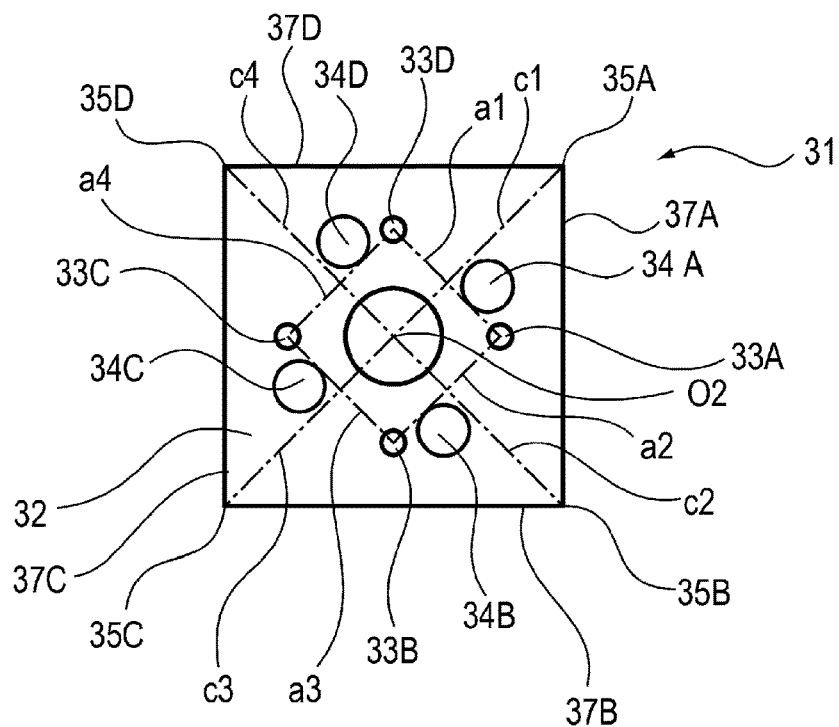

Parts (a) and (b) of FIG. 6 are bottom views of polygonal mirrors according to Embodiment 3.

Figure 7:
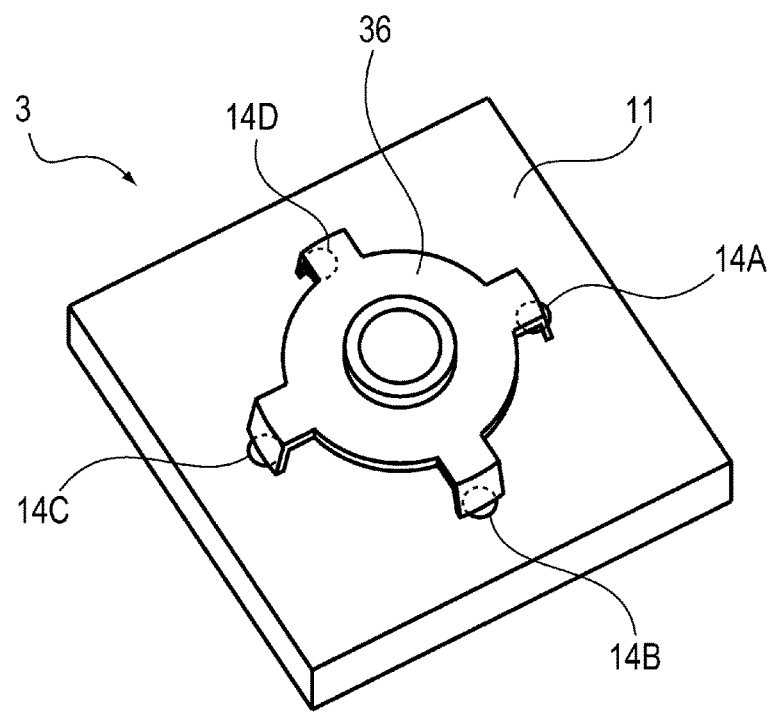

FIG. 7 is a perspective view of a top surface of the polygonal mirror.

Figure 8:
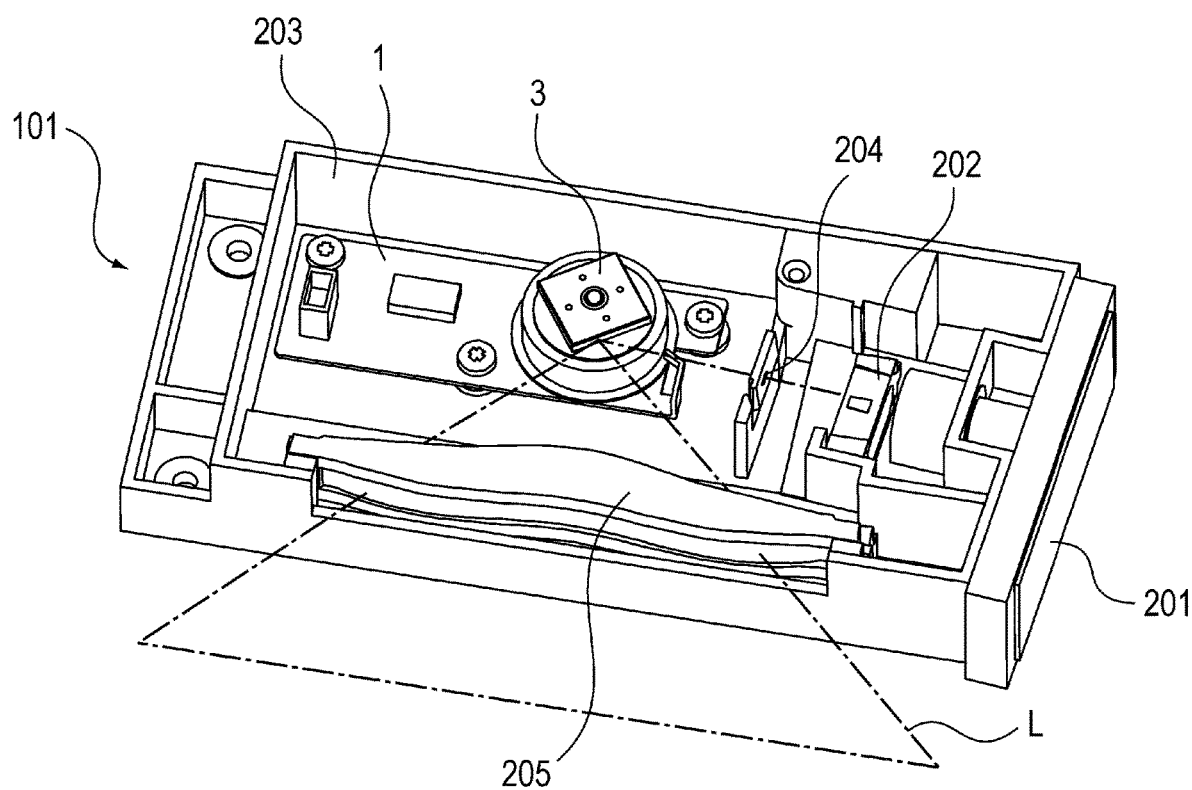

FIG. 8 is a perspective view of an optical scanning apparatus.

Figure 9:
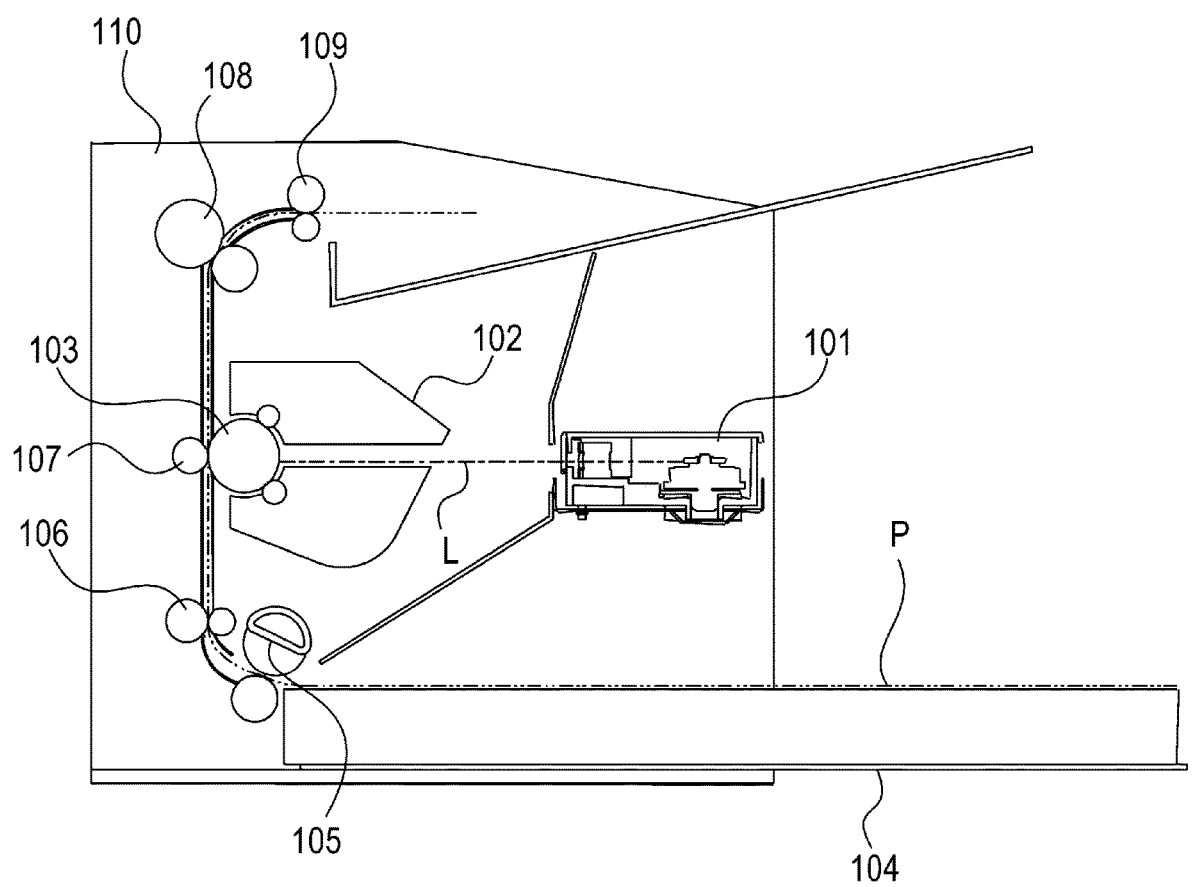

FIG. 9 is an illustration of an image forming apparatus.

Figure 10:
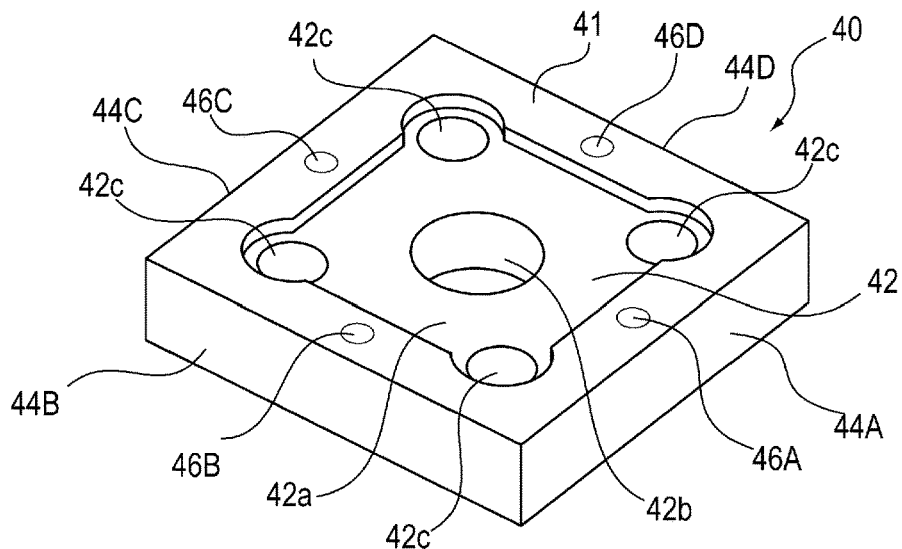
Figure 10:
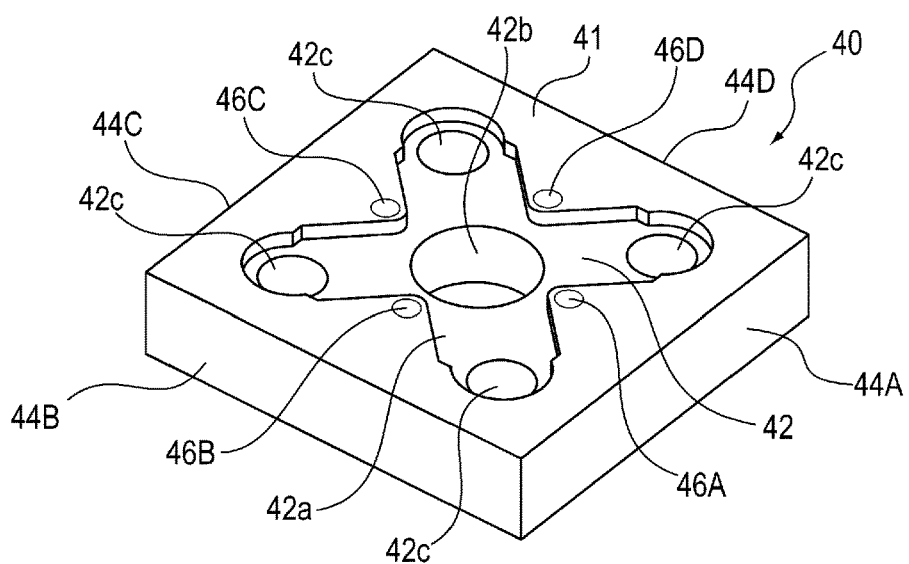
Figure 10:
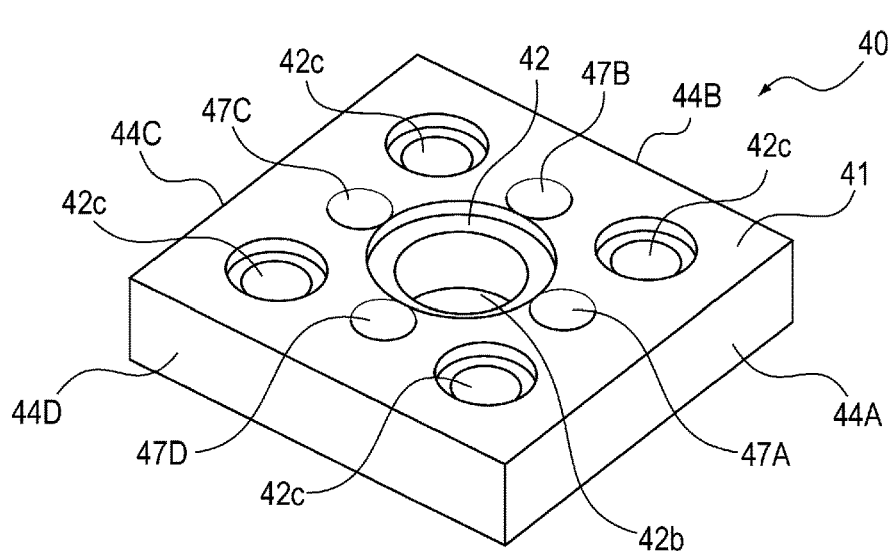

Parts (a) and (b) of FIG. 10 are perspective views of polygonal mirrors as seen from top surface sides of the polygonal mirrors according to other embodiments, and part (c) of FIG. 10 is a perspective view of a polygonal mirror as seen from a bottom side of the polygonal mirror according to another embodiment.

Figure 11:
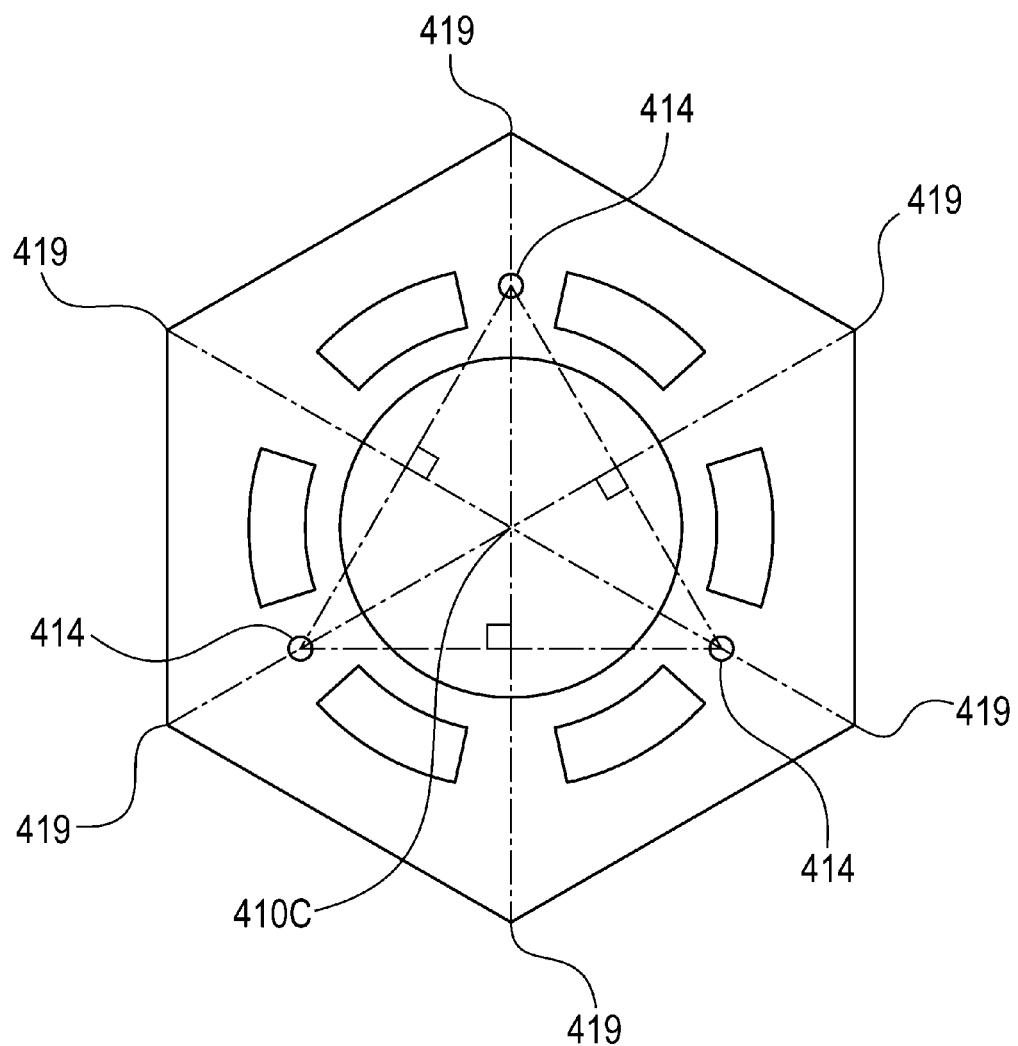

FIG. 11 is a top view of a conventional polygonal mirror.

DESCRIPTION OF EMBODIMENTS

[Embodiment 1]

With reference to the drawings, an image forming apparatus including an optical scanning apparatus according to this embodiment will be described. In the following description, first, the image forming apparatus including the optical scanning apparatus will be described as an example, and then the optical scanning apparatus in the image forming apparatus will be described.

Incidentally, as regards dimensions, materials, shapes and relative arrangements of constituent elements described in the following embodiments, the scope of the present invention is the following embodiments unless otherwise specified.

FIG. 9 is a schematic sectional view of an image forming apparatus 110 according to Embodiment 1. The image forming apparatus 110 according to this embodiment includes an optical scanning apparatus 101 and is an image forming apparatus such that a photosensitive drum 103 is scanned with laser light L by the optical scanning apparatus 101 and then an image is formed on a recording material P such as recording paper on a basis of a latent image formed by scanning. For example, the image forming apparatus is a laser beam printer of an electrophotographic type. In this embodiment, description will be made using a printer as an example of the image forming apparatus.

As shown in FIG. 9, in the image forming apparatus (printer) 110, the laser light L based on acquired image information is emitted by the optical scanning apparatus 101 as an exposure means, and a surface of the photosensitive drum 103 as an image bearing member incorporated in a process cartridge 102 is irradiated with the laser light L. Then, the latent image is formed on the photosensitive drum 103, and is visualized (developed) as a toner image with toner as a developer by the process cartridge 102. Incidentally, the process cartridge 102 integrally includes the photosensitive drum 103 and a charging means, a developing means and the like as process means actable on the photosensitive drum 103 and is mountable in and dismountable from the image forming apparatus 110.

On the other hand, recording materials P stacked on a recording material stacking plate 104 are fed while being separated one by one by a feeding roller 105 and is further fed toward a downstream side by an intermediary roller pair 106. Onto the fed recording material P, the toner image formed on the photosensitive drum 103 is transferred by a transfer roller 107. The recording material P on which an unfixed toner image is formed is fed toward a further downstream side, and then the toner image is fixed on the recording material P by a fixing device 108 including a heating member therein. Thereafter, the recording material P is discharged to an outside of the image forming apparatus 110 by a discharging roller pair 109.

Incidentally, in this embodiment, the charging means and the developing means which are used as the process means actable on the photosensitive drum 103 are integrally assembled with the photosensitive drum 103 in the process cartridge 102, but the process means may also be constituted as separate members from the photosensitive drum 103.

Next, the optical scanning apparatus 101 in the image forming apparatus 110 will be described using FIG. 8. FIG. 8 is a schematic perspective view showing a structure of the optical scanning apparatus 101 according to Embodiment 1.

The laser light L emitted from a light source 201 such as a laser semiconductor is focused in a sub-scan direction by a cylindrical lens 202 and is limited to a predetermined beam diameter by an optical aperture stop 204 formed in a casing 203. The laser light L is deflected by a polygonal mirror 3 rotationally driven about Z-axis by a scanner motor 1 which is a deflector and passes through an fθ lens 205, and thereafter is focused on an unshown image bearing member. The image bearing member is scanned with the laser light L, so that an electrostatic latent image is formed. Incidentally, the light source 201, the cylindrical lens 202, the scanner motor 1 and the like are accommodated in the casing 203, and an opening of the casing 203 is closed (covered) by an optical cap (not shown) made of a resin material or metal.

Figure 1:
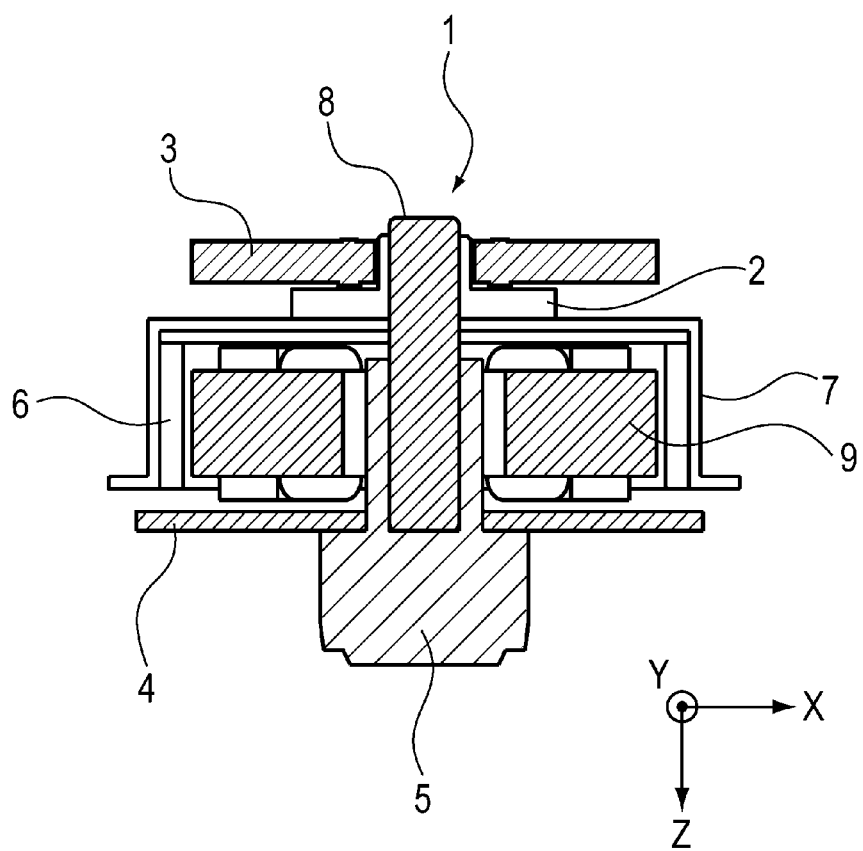
FIG. 1 is a sectional view including a rotation center of a scanner motor according to Embodiment 1.

Next, the scanner motor 1 which is the deflector in the optical scanning apparatus will be described using FIG. 1. FIG. 1 is a schematic sectional view including a rotation center of the scanner motor 1.

The scanner motor 1 is constituted by the polygonal mirror 3, a bearing sleeve 5 provided integrally with a substrate 4, a rotor 7, a rotation shaft 8, a polygonal mirror seat 2, a stator coil 9 fixed to the substrate 4, and the like. The polygonal mirror 3 deflects the laser light (light flux (beam)) L emitted from the light source device 201, so that the photosensitive drum surface is scanned with the laser light L. The bearing sleeve 5 is supported by the substrate 4 constituted by a metal plate. The rotor 7 includes a rotor magnet 6. The rotation shaft 8 is engaged with the rotor 7 and is provided integrally with the rotor 7. The polygonal mirror seat 2 as a rotatable member is used for mounting the rotation shaft 8 and the polygonal mirror 3. The polygonal mirror seat 2 engaged with the rotation shaft 8 provided integrally with the rotor 7 and rotates integrally with the rotation shaft 8. Incidentally, in this embodiment, as a rotatable member rotatable integrally with the polygonal mirror in contact with the polygonal mirror is described as an example, but the rotatable member is not limited thereto. For example, in the case where a constitution in which the polygonal mirror contacts the above-described rotor, this rotor is the rotatable member to which the polygonal mirror is contacted.

Next, the polygonal mirror 3 in the scanner motor 1 will be described using FIG. 2. Part (a) of FIG. 2 is a top perspective view of the polygonal mirror 3 according to this embodiment, and part (b) of FIG. 2 is a bottom perspective view of the polygonal mirror 3. An arrow Z direction shown in FIG. 2 is an axial direction (axis direction) of the rotation shaft 8 shown in FIG. 1. An arrow X direction is a direction perpendicular to the arrow Z direction, and an arrow Y direction is a direction perpendicular to the arrow Z direction and the arrow X direction. Also in other figures, a relationship among the arrow X direction, the arrow Y direction and the arrow Z direction is the same.

The polygonal mirror 3 is made of a resin material such as cycloolefin resin, polycarbonate resin, acrylic resin or the like, and is molded in a molded member including a plurality of side surfaces corresponding to reflecting surfaces, a bottom (surface) 12 which is first surface, and a top surface 11 which is a second surface. In this embodiment, the polygonal mirror 3 is molded in a rectangular prism shape of 14.1 mm in (one) side (circumscribed circle of 20 mm in diameter) so as to include the bottom 12, the top surface 11 and the four side surfaces. The bottom 12 of the polygonal mirror 3 is the first surface crossing the plurality of side surfaces. The top surface 11 of the polygonal mirror 3 is the second surface which crosses the plurality of side surfaces and which is provided on a side opposite from the bottom 12. The side surfaces of the polygonal mirror 3 are surfaces where the reflecting surfaces are formed. In this embodiment, on the side surfaces corresponding to the reflecting surfaces of the molded member, a metal layer is provided, so that reflecting surfaces 10A, 10B, 10C and 10D for changing (reflecting) the laser light are formed. In this embodiment, the four reflecting surfaces 10A-10D of the polygonal mirror 3 are constituted by a thin film of metal such as aluminum, copper, silver or the like, and are formed in a film by vacuum deposition, for example. The reflecting surfaces 10A-10D of the polygonal mirror 3 are a plurality of side surfaces crossing the bottom 12 and the top surface 11 between the bottom 12 and the top surface 11, and in this embodiment, flat surfaces perpendicular to the bottom 12 and the top surface 11 are illustrated as an example. Further, the polygonal mirror 3 of this embodiment is provided with a protective layer on the reflecting surfaces formed in a metal layer which is a thin film of the metal. Incidentally, in this embodiment, an example in which the four reflecting surfaces of the polygonal mirror 3 are formed by the metal layer is described, but the present invention is not limited thereto. The side surfaces (flat surfaces) of the polygonal mirror molded with the resin material may also be the reflecting surfaces. Further, a thickness of the polygonal mirror (resin member) 3 may suitably be 1.0 mm to 3.0 mm.

Further, on the top surface 11 which is the second surface of the polygonal mirror 3, four gate marks 14A, 14B, 14C and 14D which are traces where the resin material is injected during molding of the polygonal mirror 3 are formed in the same number as the reflecting surfaces. Further, on the bottom 12 which is the first surface of the polygonal mirror 3, projection-shaped bearing surfaces 13A, 13B, 13C and 13D contacting the polygonal mirror seat 2 when the polygonal mirror 3 is mounted on the polygonal mirror seat 2 (FIG. 1) are provided. The bearing surfaces 13A, 13B, 13C and 13D are formed on the bottom 12 so as to project in an axial direction (Z direction) passing through a rotation center O1 of the polygonal mirror 3. The bearing surfaces 13A, 13B, 13C and 13D are contact portions contacting the polygonal mirror seat 2 as a rotatable member rotatable about the rotation center O1 of the polygonal mirror 3. Further, the polygonal mirror 3 is provided with a through hole 15 penetrating through the top surface 11 and the bottom 12. This through hole 15 of the polygonal mirror 3 and the polygonal mirror seat 2 shown in FIG. 1 are engaged with each other, so that a position of the polygonal mirror 3 in an XY flat plane is determined. Further, the bearing surfaces 13A, 13B, 13c and 13D of the polygonal mirror 3 contact the polygonal mirror seat 2, so that a position of the polygonal mirror 3 with respect to a Z axis direction (FIG. 3) is determined. In this embodiment, the polygonal mirror 3 is fixed to the polygonal mirror seat 2 (FIG. 1) by a fixing means such as an adhesive, for example. Into the through hole 15 of the polygonal mirror 3 with which the polygonal mirror seat 2 is engaged, the rotation shaft 8 (FIG. 1) is inserted.

Then, positional constitutions of the gate marks 14A, 14B, 14C and 14D and the bearing surfaces 13A, 13B, 13C and 13D of the polygonal mirror 3 will be described using FIG. 3. Part (a) of FIG. 3 is a top view of the polygonal mirror 3 according to this embodiment, and part (b) of FIG. 3 is a bottom view of the polygonal mirror 3.

The bottom 12 which is the first surface of the polygonal mirror 3 and the top surface 11 which is the first surface of the polygonal mirror 3 have a polygonal shape which include the rotation center O1 (or O2) as the center of the polygonal mirror 3 and which includes a plurality of vertexes each constituted by a boundary portion between adjacent side surfaces. Each of the bottom 12 which is the first surface of the polygonal mirror 3 and the top surface 11 which is the second surface of the polygonal mirror 3 has a rectangular prism shape including a plurality of vertexes. The top surface 11 has a shape including four vertexes consisting of a vertex 16B which is a boundary portion between the reflecting surfaces 10A and 10B, a vertex 16C which is a boundary portion between the reflecting surfaces 10B and 10C, a vertex 16D which is a boundary portion between the reflecting surfaces 10C and 10D, and a vertex 16A which is a boundary portion between the reflecting surfaces 10D and 10A. The bottom 12 has a shape including four vertexes consisting of a vertex 17B which is a boundary portion between the reflecting surfaces 10A and 10B, a vertex 17C which is a boundary portion between the reflecting surfaces 10B and 10C, a vertex 17D which is a boundary portion between the reflecting surfaces 10C and 10D, and a vertex 17A which is a boundary portion between the reflecting surfaces 10D and 10A.

The gate marks 14A, 14B, 14C and 14D of the polygonal mirror 3 are formed so that perpendicular bisectors of light sources a1, a2, a3 and a4 each connecting centers of adjacent gate marks are in positions each connecting associated one of the vertexes 16A, 16B, 16C and 16D of the top surface 11 with the rotation center O1 on a top surface side. The gate marks 14A and 14D of the polygonal mirror 3 are formed so that a perpendicular bisector (light source b1) of a light source a1 connecting the centers of the adjacent gate marks 14A and 14D with respect to the rotational direction of the polygonal mirror 3 is in the position connecting the vertex 16A of the top surface 11 with the rotation center O1. That is, the gate marks 14A and 14D of the polygonal mirror 3 are formed at equally distant positions from the above-described light source b1 on the light source a1 perpendicular to the light source b1 connecting the boundary portion (vertex 16A) between the reflecting surfaces 10A and 10D to which the gate marks 14A and 14D correspond, respectively, to the rotation center O1. In addition, the gate marks 14A and 14D of the polygonal mirror 3 are formed at non-overlapping positions with the above-described light source b1. Further, the gate marks 14A and 14B of the polygonal mirror 3 are formed so that a perpendicular bisector (light source b2) of a light source a2 connecting the centers of the adjacent gate marks 14A and 14B with respect to the rotational direction of the polygonal mirror 3 is in the position connecting the vertex 16B of the top surface 11 with the rotation center O1. That is, the gate marks 14A and 14B of the polygonal mirror 3 are formed at equally distant positions from the above-described light source b2 on the light source a2 perpendicular to the light source b1 connecting the boundary portion (vertex 16B) between the reflecting surfaces 10A and 10B to which the gate marks 14A and 14D correspond, respectively, to the rotation center O1. In addition, the gate marks 14A and 14B of the polygonal mirror 3 are formed at non-overlapping positions with the above-described light source b2. Other gate marks of the polygonal mirror 3 are formed similarly as in the above-described gate marks.

Further, the bearing surfaces 13A, 13B, 13C and 13D of the polygonal mirror 3 are formed at non-overlapping positions with light sources c1, c2, c3 and c4 connecting vertexes 17A, 17B, 17C and 17D of the bottom 12, respectively, with the rotation center O2 on a bottom side. The bearing surface 13A of the polygonal mirror 3 is formed at the non-overlapping position with the light source c1 connecting the vertex 17A of the bottom 12 with the bottom-side rotation center O2. In addition, the bearing surface 13A of the polygonal mirror 3 is formed at the non-overlapping position with the light source c2 connecting the vertex 17B of the bottom 12 with the bottom-side rotation center O2. Other bearing surfaces 13B, 13C and 13D of the polygonal mirror 3 are also formed similarly as in the above-described bearing surface 13A.

As regards the polygonal mirror 3 according to this embodiment, the gate marks 14A, 14B, 14C and 14D and the bearing surfaces 13A, 13B, 13C and 13D are formed at non-overlapping positions with the light sources connecting the respective vertexes of the polygonal shape with the rotation centers. By providing the gate marks and the bearing surfaces at such positions, effects shown below can be achieved.

Parts (a) and (b) of FIG. 4 are schematic views for illustrating a flow of the resin material during injection molding of the polygonal mirror 3 according to this embodiment, in which part (a) of FIG. 4 is a top view of the polygonal mirror 3, and part (b) of FIG. 4 is a bottom view of the polygonal mirror 3.

As shown in part (a) of FIG. 4, the resin material injected from the positions shown by the respective gate marks 14A, 14B, 14C and 14D is filled (charged) while expanding from the respective gate marks as centers as shown by curved broken lines d. Then, the resin material merges at the light sources b1, b2, b3 and b4 connecting the vertexes 16A, 16B, 16C and 16D, respectively, with the rotation center O1 of the polygonal mirror 3. That is, as regards the polygonal mirror 3 according to this embodiment, merged portions of the resin material injected from the positions shown by the respective gate marks are in the positions of the light sources b1, b2, b3 and b4 each between adjacent gate marks. For that reason, in the polygonal mirror 3 which is a molded member, even when weld lines 18 generate at the merged portions (light sources b1, b2, b3 and b4) of the resin material, the weld lines 18 generate at end portions of the reflecting surfaces 10A, 10B, 10C and 10D. Accordingly, the influence of the weld lines 18 on the reflecting surfaces 10A, 10B, 10C and 10D becomes small, so that a deterioration of profile irregularity such as lowering in reflectance and flatness of the reflecting surfaces 10A, 10B, 10C and 10D can be prevented. In this embodiment, the resin material is injected from the gates which are the same in number as the reflecting surfaces. This is because the weld lines are easily formed on the light sources connecting the vertexes of the surfaces of the polygonal shape with the rotation center.

Further, as shown in part (b) of FIG. 4, weld lines 18 formed on the bottom 12 generate on light sources e1, e2, e3 and e4 obtained by projecting the perpendicular bisectors of the light sources a1, a2, a3 and a4 of the top surface 11 shown in part (a) of FIG. 3, on the bottom 12. For that reason, the weld lines 18 do not generate on the bearing surfaces 13A, 13B, 13C and 13D formed at positions spaced from the light sources c1, c2, c3 and c4 which are the above-described light sources e1, e2, e3 and e4 and which connects the respective vertexes of the bottom 12 shown in part (b) of FIG. 3 with the rotation center. Accordingly, the bearing surfaces of the polygonal mirror 3 can be stably contacted to the polygonal mirror seat 2 more accurately, so that an occurrence of face (surface) inclination or the like of the polygonal mirror is suppressed, and thus a high-definition image can be obtained.

Incidentally, in this embodiment, a constitution in which as the contact portions contacting the polygonal mirror seat 2 as the rotatable member, the projection-shaped bearing surfaces 13A, 13B, 13C and 13D were provided at the non-overlapping positions with the weld lines 18 of the bottom 12 was described as an example, but the present invention is not limited thereto. For example, a constitution in which the bottom 12 including the contact portions constituted by a flat surface is formed and the shape of the polygonal mirror seat 2 as the rotatable member is such that recessed portions are formed only at positions opposing the weld lines 18 of the bottom 12 may also be employed. That is, the polygonal mirror seat 2 may also be a recessed portion such that the polygonal mirror seat 2 contacts at a position other than the weld lines 18 of the bottom 12 and does not contact at a position opposing the weld lines 18.

[Embodiment 2]

Next, a polygonal mirror according to Embodiment 2 will be described. Incidentally, in this embodiment, a constitution of an image forming apparatus including an optical scanning apparatus except for the polygonal mirror is similar to that in Embodiment 1, and therefore, description thereof will be omitted in this embodiment. Further, as regards portions common to Embodiments 1 and 2 relating to the polygonal mirror, the same reference numerals or symbols are added and description thereof will be omitted.

Parts (a) to (c) of FIG. 5 are illustrations of a polygonal mirror 20 in Embodiment 2, in which part (a) of FIG. 5 is a sectional view of the polygonal mirror 20 showing this embodiment and including a rotation center thereof, part (b) of FIG. 5 is a top view of the polygonal mirror 20, and part (c) of FIG. 5 is a bottom view of the polygonal mirror 20.

The polygonal mirror 20 according to this embodiment is prepared by integrally constituting a base material 22 made of a metal material and a molded member 21 as a molded member provided outside the base material 22 and made of a resin material through an insert molding or the like. That is, the polygonal mirror 20 includes the molded member 21 molded with the resin material outside the base material 22 made of the metal material. In this embodiment, the base material 22 is constituted by the metal material such as aluminum, iron, stainless steel or a steel plate, and the molded member 21 which is the molded member is constituted by the resin material such as cycloolefin resin, polycarbonate resin or acrylic resin.

The molded member 21 has a prism shape molded with the resin material so as to cover four side surfaces of the metal base material 22, a bottom which is one surface crossing the side surfaces, and a top surface which is the other surface crossing the side surfaces on a side opposite from the bottom, and the molded member 21 is 14.1 mm in one side (20 mm in diameter of circumscribed circle). The molded member 21 molded with the resin material includes a plurality of side surfaces corresponding to reflecting surfaces, a bottom 25 which is a first surface and a top surface 23 which is a second surface on a side opposite from the bottom 25. The side surfaces of the polygonal mirror 3 are surfaces where the reflecting surfaces are formed. That is, on the side surfaces of the polygonal mirror 20, a metal layer is provided, so that reflecting surfaces 24A, 24B, 24C and 24D for changing (reflecting) the laser light are formed. In this embodiment, the four reflecting surfaces 24A-24D of the polygonal mirror 20 are constituted by a thin film of metal such as aluminum, copper, silver or the like, and are formed in a film by vacuum deposition, for example. Further, the polygonal mirror 20 is provided with a protective layer on the reflecting surfaces formed in the thin film of the metal. Incidentally, in this embodiment, an example in which the four reflecting surfaces formed by providing the metal layer on the four side surfaces of the polygonal mirror 20 is described, but the present invention is not limited thereto. The side surfaces (flat surfaces) of the polygonal mirror molded with the resin material may also be the reflecting surfaces. Further, a thickness of the metal base material 22 from the bottom to the top surface may suitably be in a range from 1.0 mm to 2.0 mm. Further, a thickness of the molded member (resin member) 21 from an outside surface of the metal base material 22 to an outside surface of the molded member 21 may suitably be in a range from 0.1 mm to 2.0 mm.

Further, on the top surface 23 which is the second surface of the polygonal mirror 20, four gate marks 26A, 26B, 26C and 26D which are traces where the resin material is injected during molding of the polygonal mirror 20 are formed in the same number as the reflecting surfaces. Further, on the bottom 25 which is the first surface of the polygonal mirror 20, projection-shaped bearing surfaces 27A, 27B, 27C and 27D as contact portions for mounting the polygonal mirror 20 on the polygonal mirror seat 2 (FIG. 1) are provided. Further, the polygonal mirror 20 is provided with a through hole 28 penetrating through the top surface 23 and the bottom 25 via the metal bearing surface 22. This through hole 28 of the polygonal mirror 20 and the polygonal mirror seat 2 shown in FIG. 1 are engaged with each other, so that a position of the polygonal mirror 20 in an XY flat plane is determined. Further, the bearing surfaces 27A, 27B, 27c and 27D of the polygonal mirror 20 contact the polygonal mirror seat 2, so that a position of the polygonal mirror 20 with respect to a Z axis direction (part (a) of FIG. 5) is determined. In this embodiment, the polygonal mirror 20 is fixed to the polygonal mirror seat 2 (FIG. 1) by a fixing means such as an adhesive, for example. Into the through hole 28 of the polygonal mirror 20 with which the polygonal mirror seat 2 is engaged, the rotation shaft 8 (FIG. 1) is inserted.

Then, positional constitutions of the gate marks 26A, 26B, 26C and 26D and the bearing surfaces 27A, 27B, 27C and 27D of the polygonal mirror 20 will be described using parts (b) and (c) of FIG. 5.

The bottom 25 which is the first surface of the polygonal mirror 20 and the top surface 23 which is the first surface of the polygonal mirror 20 have a polygonal shape which include the rotation center O1 (or O2) as the center of the polygonal mirror 20 and which includes a plurality of vertexes each constituted by a boundary portion between adjacent side surfaces. The top surface 23 has a shape including four vertexes consisting of a vertex 29B which is a boundary portion between the reflecting surfaces 24A and 24B, a vertex 29C which is a boundary portion between the reflecting surfaces 24B and 24C, a vertex 29D which is a boundary portion between the reflecting surfaces 24C and 24D, and a vertex 29A which is a boundary portion between the reflecting surfaces 24D and 24A. The bottom 25 has a shape including four vertexes consisting of a vertex 30B which is a boundary portion between the reflecting surfaces 24A and 24B, a vertex 30C which is a boundary portion between the reflecting surfaces 24B and 24C, a vertex 30D which is a boundary portion between the reflecting surfaces 24C and 24D, and a vertex 30A which is a boundary portion between the reflecting surfaces 24D and 24A.

The gate marks 26A, 26B, 26C and 26D of the polygonal mirror 20 are formed so that perpendicular bisectors of light sources a1, a2, a3 and a4 each connecting centers of adjacent gate marks are in positions each connecting associated one of the vertexes 29A, 29B, 29C and 29D of the top surface 23 with the rotation center O1. The gate marks 26A and 26D of the polygonal mirror 20 are formed so that a perpendicular bisector (light source b1) of a light source a1 connecting the centers of the adjacent gate marks 26A and 26D with respect to the rotational direction of the polygonal mirror 20 is in the position connecting the vertex 29A of the top surface 23 with the rotation center O1. That is, the gate marks 26A and 26D of the polygonal mirror 20 are formed at equally distant positions from the above-described light source b1 on the light source a1 perpendicular to the light source b1 connecting the boundary portion (vertex 29A) between the reflecting surfaces 24A and 24D to which the gate marks 26A and 26D correspond, respectively, to the rotation center O1. In addition, the gate marks 26A and 26D of the polygonal mirror 20 are formed at non-overlapping positions with the above-described light source b1. Further, the gate marks 26A and 26B of the polygonal mirror 20 are formed so that a perpendicular bisector (light source b2) of a light source a2 connecting the centers of the adjacent gate marks 26A and 26B with respect to the rotational direction of the polygonal mirror 20 is in the position connecting the vertex 29B of the top surface 23 with the rotation center O1. That is, the gate marks 26A and 26B of the polygonal mirror 20 are formed at equally distant positions from the above-described light source b2 on the light source a2 perpendicular to the light source b1 connecting the boundary portion (vertex 29B) between the reflecting surfaces 24A and 24B to which the gate marks 26A and 26D correspond, respectively, to the rotation center O1. In addition, the gate marks 26A and 26B of the polygonal mirror 20 are formed at non-overlapping positions with the above-described light source b2. Other gate marks of the polygonal mirror 20 are formed similarly as in the above-described gate marks.

Further, the bearing surfaces 27A, 27B, 27C and 27D of the polygonal mirror 20 are formed at non-overlapping positions with light sources c1, c2, c3 and c4 connecting vertexes 30A, 30B, 30C and 30D of the bottom 25, respectively, with the rotation center O2 on a bottom side of the polygonal mirror 20. The bearing surface 27A of the polygonal mirror 20 is formed at the non-overlapping position with the light source c1 connecting the vertex 30A of the bottom 25 with the bottom-side rotation center O2. In addition, the bearing surface 27A of the polygonal mirror 20 is formed at the non-overlapping position with the light source c2 connecting the vertex 30B of the bottom 25 with the bottom-side rotation center O2. Other bearing surfaces 27B, 27C and 27D of the polygonal mirror 20 are also formed similarly as in the above-described bearing surface 27A.

As regards the polygonal mirror 20 according to this embodiment, the gate marks 26A, 26B, 26C and 26D and the bearing surfaces 27A, 27B, 27C and g27D are formed at the above-described positions, so that effects similar to those of the above-described Embodiment 1.

Further, as regards the polygonal mirror 20 according to this embodiment, the base material 22 made of the metal material and the molded member 21 provided outside the base material 22 and made of the resin material are integrally molded with each other. As a result, strength of the polygonal mirror is further enhanced, and even when the polygonal mirror is used in a high-speed rotation state, it is possible to prevent profile irregularity such as deformation or the like of the reflecting surfaces due to centrifugal force or the like.

Incidentally, in the above-described Embodiments 1 and 2, the gate marks and the bearing surfaces of the polygonal mirror may preferably be formed at the positions having rotation symmetry about the rotation centers O1 and O2 in order to further improve the profile irregularity and to stably mount the polygonal mirror on the polygonal mirror seat.

Further, in the case where the polygonal mirror is seen in the axial direction of the rotation shaft 8 passing through the rotation centers O1 and O2, when the gate marks and the bearing surfaces of the polygonal mirror are provided at overlapping positions with each other, it is possible to prevent an occurrence of weld lines on the bearing surfaces with further reliability. In addition, such positioning is also advantageous in terms of prevention of shrinkage (sinkage) by the bearing surfaces.

[Embodiment 3]

Next, a polygonal mirror according to Embodiment 3 will be described using parts (a) and (b) of FIG. 6. Parts (a) and (b) of FIG. 6 are bottom views of polygonal mirrors 31 showing this embodiment.

Incidentally, the polygonal mirror 31 according to this embodiment may also be a molded product prepared by subjecting the resin material to injection molding as in the case of the polygonal mirror 3 in Embodiment 1. Alternatively, the polygonal mirror 31 may also be a molded product prepared by integrally providing a molded member made of the resin material outside a base material made of the metal material as in the case of the polygonal mirror 20 in Embodiment 2.

The polygonal mirror 31 according to this embodiment is different from the polygonal mirrors of the above-described Embodiments 1 and 2 in positional constitutions of the gate marks and the bearing surfaces as shown in parts (a) and (b) of FIG. 6. In the following, the polygonal mirror 31 will be specifically described using the drawing. Incidentally, other constitutions are similar to those of the above-described embodiments, and therefore will be omitted from description in this embodiment.

As regards the polygonal mirror 31 according to this embodiment, on a bottom 32 which is a first surface made of the resin material, bearing surfaces 34A, 34B, 34C and 34D as contact portions and gate marks 33A, 33B, 33C and 33D are formed.

Further, the gate marks 33A, 33B, 33C and 33D of the polygonal mirror 31 are formed so that perpendicular bisectors of light sources a1, a2, a3 and a4 each connecting centers of adjacent gate marks are in positions each connecting associated one of the vertexes 35A, 35B, 35C and 35D of a bottom 32 with the rotation center O2. The gate marks 33A and 33D of the polygonal mirror 31 are formed so that a perpendicular bisector (light source c1) of a light source a1 connecting the centers of the adjacent gate marks 33A and 33D with respect to the rotational direction of the polygonal mirror 31 is in the position connecting the vertex 35A of the bottom 25 with the rotation center O2. That is, the gate marks 33A and 33D of the polygonal mirror 31 are formed at equally distant positions from the above-described light source c1 on the light source a1 perpendicular to the light source c1 connecting the boundary portion (vertex 35A) between the reflecting surfaces 37A and 37D to which the gate marks 33A and 33D correspond, respectively, to the rotation center O2. In addition, the gate marks 33A and 33D of the polygonal mirror 31 are formed at non-overlapping positions with the above-described light source c1. Further, the gate marks 33A and 33B of the polygonal mirror 31 are formed so that a perpendicular bisector (light source c2) of a light source a2 connecting the centers of the adjacent gate marks 33A and 33B with respect to the rotational direction of the polygonal mirror 31 is in the position connecting the vertex 35B of the bottom 32 with the rotation center O2. That is, the gate marks 33A and 33B of the polygonal mirror 31 are formed at equally distant positions from the above-described light source c2 on the light source a2 perpendicular to the light source c1 connecting the boundary portion (vertex 35B) between the reflecting surfaces 37A and 37B to which the gate marks 33A and 33B correspond, respectively, to the rotation center O2. In addition, the gate marks 33A and 33B of the polygonal mirror 31 are formed at non-overlapping positions with the above-described light source c2. Other gate marks of the polygonal mirror 31 are formed similarly as in the above-described gate marks.

Further, the bearing surfaces 34A, 34B, 34C and 34D of the polygonal mirror 31 are formed at non-overlapping positions with light sources c1, c2, c3 and c4 connecting vertexes 35A, 35B, 35C and 35D of the bottom 32, respectively, with the rotation center O2 on a bottom side and at non-overlapping positions with the gate marks 33A, 33B, 33C and 33D, respectively. The bearing surface 34A of the polygonal mirror 31 is formed at the non-overlapping position with the light source c1 connecting the vertex 35A of the bottom 32 with the bottom-side rotation center O2 and at the non-overlapping position with the gate mark 33A. In addition, the bearing surface 34A of the polygonal mirror 31 is formed at the non-overlapping position with the light source c2 connecting the vertex 35B of the bottom 32 with the bottom-side rotation center O2. Other bearing surfaces 34B, 34C and 34D of the polygonal mirror 31 are also formed similarly as in the above-described bearing surface 34A.

Further, specifically, the bearing surfaces 34A, 34B, 34C and 34D are formed at positions shown in part (a) of FIG. 6 or part (b) of FIG. 6.

In the polygonal mirror 31 shown in part (a9 of FIG. 6, the bearing surfaces 34A, 34B, 34C and 34D are formed between the rotation center O2 and the gate marks 33A, 33B, 33C and 33D, respectively.

In the polygonal mirror 31 shown in part (b) of FIG. 6, the bearing surfaces 34A, 34B, 34C and 34D are formed substantially concentrically with the gate marks 33A, 33B, 33C and 33D, respectively, about the rotation center O2.

Further, the bearing surfaces 34A, 34B, 34C and 34D of each of the polygonal mirror shown in part (a) of FIG. 6 and the polygonal mirror shown in part (b) of FIG. 6 are formed at positions having rotation symmetry about the rotation center O2.

By constituting the polygonal mirror as described above, the bearing surfaces 34A, 34B, 34C and 34D without being influenced by the gate marks 33A, 33B, 33C and 33D and by the weld lines 18. As a result, even when the bearing surfaces and the gate marks are formed on one surface of the polygonal mirror 31, the polygonal mirror 31 can be stably mounted on the polygonal mirror seat 2 with high accuracy.

Next, an effect of this embodiment will be described using FIG. 7. FIG. 7 is a perspective view of a top surface of a polygonal mirror 3 fixed by a spring 36.

In the above-described Embodiments 1 and 2, the constitution in which the polygonal mirrors 3 and 20 are fixed by the adhesive or the like were described as an example, but the present invention is not limited thereto. For example, a constitution in which the top surface, of the polygonal mirror, which is the second surface on the side opposite from the bottom which is the first surface on which the bearing surfaces and the gate marks are provided is fixed by an urging member such as a spring may also be employed.

For example, as shown in FIG. 7, in the case where a constitution in which the gate marks 14A, 14B, 14C and 14D are formed on the top surface 11 of the polygonal mirror 3 is employed, when the top surface 11 of the polygonal mirror 3 is fixed by being urged by the urging member such as the spring 36, the following would be considered.

In general, the surfaces of the gate marks are not uniform flat surfaces, and when the top surface 11 of the polygonal mirror 3 having the gate marks is urged by the spring 36, the gate marks 14A, 14B, 14C and 14D are urged by the spring 36 as shown in FIG. 7 in some instances. In this case, the surfaces of the gate marks 14A, 14B, 14C and 14D are not uniform surfaces, and therefore, there was a liability that an urging force is localized when the gate marks are urged by the spring 36, and thus, for example, face inclination or the like occurs. For that reason, there was a need to limit urging positions of the spring 36 to non-overlapping positions with the gate marks 14A, 14B, 14C and 14D.

On the other hand, as regards the polygonal mirror 31 according to this embodiment, the gate marks 33A, 33B, 33C and 33D are formed on the bottom 32, on which the bearing surfaces 34A, 34B, 34C and 34D are provided, positioned on the side opposite from the top surface. For that reason, even in the case where the top surface of the polygonal mirror is urged by the spring 36, there is no need to limit the urging positions of the spring 36.

[Other Embodiments]

In the above-described Embodiment 2, a constitution in which entirety of the outside of the base material made of the metal material is covered with the molded member made of the resin material was described as an example, but the present invention is not limited thereto. For example, when the constitution in which the gate marks and the bearing surfaces are formed on the bottom which is the first surface of the polygonal mirror as in the above-described Embodiment 3 is employed, a constitution in which of the outside surfaces of the base material including one surface and the other surface, the other surface on the side opposite from one surface is not covered with the molded member made of the resin material may also be used. That is, a constitution in which the polygonal mirror includes the base material made of the metal material and the molded member which is provided outside the base material and which includes the first surface (bottom) molded with the resin material and the plurality of side surfaces (reflecting surfaces) crossing the first surface may also be employed.

Further, the constitution of the polygonal mirror in which the outside of the base material made of the metal material is covered with the molded member made of the resin material is not limited to those described in the aforementioned embodiments. For example, the polygonal mirror may also employ a constitution in which the molded member made of the resin material does not cover entirety of the outside of the base material made of the metal material, and does not cover a part of the base material made of the metal material. Specifically, such a constitution is shown in parts (a), (b) and (c) of FIG. 10. Parts (a) and (b) of FIG. 10 are perspective views of polygonal mirrors as seen from top surface sides, and part (c) of FIG. 10 is a perspective view of a polygonal mirror as seen from a bottom side. Polygonal mirrors 40 shown in parts (a), (b) and (c) of FIG. 10 are configured so that a molded member 41 made of the resin material does not cover holes 42a and 42b and a part of a top surface 42a of a base material 42. Conversely, the part of the top surface 42a is covered with the resin material. Here, the holes 42c of the base material 42 refer to four holes positioned on lines each connecting a rotation center of the polygonal shape with an associated one of vertexes of the polygonal shape. In addition to these (four) holes 42c, the base material 42 includes the hole 42b at a central portion thereof constituting the rotation center thereof, and this hole 42b is a through hole in which the polygonal mirror seat (or the rotation shaft) is engageable.

As shown in parts (a) and (b) of FIG. 10, the polygonal mirror 40 has a constitution including the molded member 41 which includes a bottom 45 which is a first surface, reflecting surfaces 44A-44D which are side surfaces, and a top surface 43 covering at least a part of the top surface of the base material 42. The top surface 43 of the molded member 41 is a second surface (positioned on a side opposite from the first surface) covering at least the part of the top surface 42a of the base material 42. In this case, similarly as in the above-described embodiments, gate marks 46A-46D of the top surface 43 which is the second surface of the molded member 41 are provided at positions which do not overlap with weld lines. Incidentally, the polygonal mirror shown in part (a) of FIG. 10 and the polygonal mirror shown in part (b) of FIG. 10 are of types different in range in which the molded member covers the part of the base material on the top surface side.

Incidentally, part (c) of FIG. 10 shows the polygonal mirror 40 on the bottom side. On the bottom side of the polygonal mirror 40, portions other than the holes 42b and 42c of the base material 42 made of the metal material are covered with the molded member 41 made of the resin material. On the bottom 45 which is the first surface of the molded member 41, bearing surfaces 47A-47D are provided at positions which do not overlap with weld lines. In this way, the polygonal mirror having a constitution in which the outside of the base material made of the metal material is covered with the molded member made of the resin material may also be provided.

Further, in the above-described embodiments, as the polygonal mirror including the plurality of reflecting surfaces, a square polygonal mirror including four reflecting surfaces was described as an example, but is not limited thereto. The shape of the polygonal mirror may appropriately be set as desired in such a manner that the shape is changed to a regular pentagon including five reflecting surfaces.

In the above-described embodiments, as the process cartridge mountable in and dismountable from the image forming apparatus, the process cartridge integrally including the photosensitive drum, and the charging means, the developing means and the cleaning means which are the process means actable on the photosensitive drum was described as an example. However, the present invention is not limited thereto. For example, the process cartridge may also be a drum cartridge integrally including, the photosensitive drum and the cleaning means separately from the charging means and the developing means.

Further, in the above-described embodiments, the constitution in which the process cartridge including the photosensitive drum is mountable in and dismountable from the image forming apparatus was described as an example, but the present invention is not limited thereto. For example, it is also possible to provide an image forming apparatus in which respective constituent elements are incorporated or an image forming apparatus in which each of the respective constituent elements is mountable in and dismountable from the image forming apparatus.

Further, in the above-described embodiments, as the image forming apparatus, the printer was described as an example, but the present invention is not limited thereto. For example, the image forming apparatus may also be other image forming apparatuses such as a copying machine, a facsimile machine and a multi-function machine having functions of these machines in combination. Further, as the image forming apparatus, the image forming apparatus for forming a monochromatic image was described, but the present invention is not limited thereto. For example, the image forming apparatus may also be an image forming apparatus for forming a color image. By applying the present invention to the optical scanning apparatus, the deflector and the polygonal mirror which are usable in the above-described image forming apparatuses, similar effects can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-082891 filed on Apr. 24, 2018, which is hereby incorporated by reference herein in its entirety.

What is claimed is:

1. A polygonal mirror comprising:
   a plurality of reflecting surfaces capable of reflecting laser light emitted from a light source;
   a molded member molded with a resin material and including a plurality of side surfaces corresponding to said reflecting surfaces, a first surface connected to said side surfaces, and a second surface connected to said side surfaces and provided on a side opposite from said first surface with respect to an axial direction passing through a rotation center of said polygonal mirror;
   a plurality of contact portions formed on said first surface so as to project in the axial direction and configured to contact a rotatable member rotatable about the rotation center of said polygonal mirror, said contact portions arranged with rotational symmetry about the rotation center of said polygonal mirror; and
   a plurality of cylindrical gate marks on said second surface being traces of injection of the resin material,
   wherein, as seen in the axial direction, each of said first surface and said second surface has a polygonal shape which has a center as the rotation center of said polygonal mirror and which has a plurality of vertexes each comprising a boundary portion between adjacent side surfaces of said side surfaces,
   wherein, as seen in the axial direction, said contact portions and said cylindrical gate marks are formed at non-overlapping positions with a plurality of line segments connecting the plurality of vertexes with the rotation center,
   wherein said contact portions, said cylindrical gate marks, and said reflecting surfaces are the same in number,
   wherein, as seen in the axial direction, said cylindrical gate marks are arranged so that a perpendicular bisector of a line segment connecting centers of said cylindrical gate marks adjacent to each other with respect to a rotational direction of said polygonal mirror passes through an associated vertex of the plurality of vertexes and the rotation center, and
   wherein said contact portions and said cylindrical gate marks are arranged at same positions with respect to the rotational direction of said polygonal mirror.

2. The polygonal mirror according to claim 1, wherein said contact portions and said cylindrical gate marks overlap with each other when viewed in the axial direction.

3. The polygonal mirror according to claim 1, further comprising a base member made of a metal material inside said molded member molded with the resin material.

4. The polygonal mirror according to claim 1, further comprising a metal layer on said side surfaces.

5. The polygonal mirror according to claim 4, further comprising a protective layer provided on said metal layer and configured to protect said metal layer.

6. A deflector comprising:
   the polygonal mirror according to claim 1; and
   a rotatable member contacting said contact portions formed on said first surface of said polygonal mirror,
   wherein a laser light emitted from a light source is subjected to deflection scanning by said reflecting surfaces of said polygonal mirror through rotation of said polygonal mirror.

7. An optical scanning apparatus comprising:
   a light source; and
   the deflector according to claim 6,
   wherein the laser light emitted from said light source is subjected to deflection scanning on an image bearing member by said deflector.

8. An image forming apparatus comprising:
   the optical scanning apparatus according to claim 7,
   wherein the image bearing member is scanned with the laser light by said optical scanning apparatus, and an image is formed on a recording material on the basis of an image formed by scanning.

9. The polygonal mirror according to claim 1, wherein each of the contact portions has a cylindrical shape.

10. A polygonal mirror comprising:
    a plurality of reflecting surfaces capable of reflecting laser light emitted from a light source; and
    a molded member molded with a resin material and including a plurality of side surfaces corresponding to said reflecting surfaces, a first surface connected to said side surfaces, a second surface connected to said side surfaces and provided on a side opposite from said first surface with respect to an axial direction passing through a rotation center of said polygonal mirror, a plurality of cylindrical contact portions formed on said first surface so as to project in the axial direction and configured to contact a rotatable member rotatable about the rotation center of said polygonal mirror, and a plurality of cylindrical gate marks on said second surface being traces of injection of the resin material,
    wherein said cylindrical contact portions are arranged with rotational symmetry about the rotation center of said polygonal mirror,
    wherein, as seen in the axial direction, each of said first surface and said second surface has a polygonal shape which has a center as the rotation center of said polygonal mirror and which has a plurality of vertexes each comprising a boundary portion between adjacent side surfaces of said side surfaces,
    wherein, as seen in the axial direction, said cylindrical contact portions and said cylindrical gate marks are formed at non-overlapping positions with a plurality of line segments connecting the plurality of vertexes with the rotation center,
    wherein said cylindrical contact portions, said cylindrical gate marks, and said reflecting surfaces are the same in number, and wherein, as seen in the axial direction, said cylindrical gate marks are arranged so that a perpendicular bisector of a line segment connecting centers of said cylindrical gate marks adjacent to each other with respect to a rotational direction of said polygonal mirror passes through an associated vertex of the plurality of vertexes and the rotation center.

11. The polygonal mirror according to claim 10, wherein said cylindrical contact portions and said cylindrical gate marks are arranged at same positions with respect to the rotational direction of said polygonal mirror.

12. The polygonal mirror according to claim 11, wherein said cylindrical contact portions and said cylindrical gate marks overlap with each other when viewed in the axial direction.

13. The polygonal mirror according to claim 10, further comprising a base member made of a metal material inside said molded member molded with the resin material.

14. The polygonal mirror according to claim 10, further comprising a metal layer on said side surfaces.

15. The polygonal mirror according to claim 14, further comprising a protective layer provided on said metal layer and configured to protect said metal layer.

16. A deflector comprising:
the polygonal mirror according to claim 10; and
a rotatable member contacting said cylindrical contact portions formed on said first surface of said polygonal mirror,
wherein a laser light emitted from a light source is subjected to deflection scanning by said reflecting surfaces of said polygonal mirror through rotation of said polygonal mirror.

17. An optical scanning apparatus comprising:
a light source; and
the deflector according to claim 16,
wherein the laser light emitted from said light source is subjected to deflection scanning on an image bearing member by said deflector.

18. An image forming apparatus comprising:
the optical scanning apparatus according to claim 17,
wherein the image bearing member is scanned with the laser light by said optical scanning apparatus, and an image is formed on a recording material on the basis of an image formed by scanning.

* * * * *